(12) United States Patent
Kane

(10) Patent No.: US 9,612,885 B1
(45) Date of Patent: Apr. 4, 2017

(54) SYSTEM AND METHOD FOR PROVIDING A TRANSIENT AND REMOVABLE INFLECTION POINT

(71) Applicant: John Patrick Kane, Tafton, PA (US)

(72) Inventor: John Patrick Kane, Tafton, PA (US)

(73) Assignee: CA, Inc., New York, NY (US)

(*) Notice: Subject to any disclaimer, the term of this patent is extended or adjusted under 35 U.S.C. 154(b) by 435 days.

(21) Appl. No.: 13/856,104

(22) Filed: Apr. 3, 2013

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .................................. *G06F 9/542* (2013.01)

(58) Field of Classification Search
None
See application file for complete search history.

(56) References Cited

U.S. PATENT DOCUMENTS

| | | | | |
|---|---|---|---|---|
| 6,351,843 | B1 * | 2/2002 | Berkley | G06F 8/70 713/100 |
| 7,945,958 | B2 * | 5/2011 | Amarasinghe | G06F 21/53 726/22 |
| 8,612,612 | B1 * | 12/2013 | Dukes | H04L 67/14 370/230 |
| 8,910,124 | B1 * | 12/2014 | Bhansali et al. | 717/128 |
| 2002/0199172 | A1 * | 12/2002 | Bunnell | 717/128 |
| 2006/0064737 | A1 * | 3/2006 | Wallace | G06F 21/604 726/1 |
| 2006/0294431 | A1 * | 12/2006 | Bader | G06F 11/3476 714/38.14 |
| 2008/0126541 | A1 * | 5/2008 | Rosenberg | H04L 65/1016 709/225 |
| 2009/0328211 | A1 * | 12/2009 | Abraham | G06F 21/54 726/22 |
| 2013/0132933 | A1 * | 5/2013 | Rajaram et al. | 717/126 |
| 2014/0189647 | A1 * | 7/2014 | Kaushik et al. | 717/124 |

* cited by examiner

*Primary Examiner* — Diem Cao
(74) *Attorney, Agent, or Firm* — Baker Botts L.L.P.

(57) ABSTRACT

Methods include identifying when a first event associated with a program occurs. The methods also include determining whether to control a behavior of the program when the first event occurs. Moreover, the methods include identifying a location in a memory to add an inflection point in response to determining to control the behavior of the program. The memory comprises a loaded version of the program. The inflection point comprises an instruction corresponding to the behavior. The methods further include adding the inflection point to the memory at the identified location.

18 Claims, 6 Drawing Sheets

SYSTEM AND METHOD FOR PROVIDING A TRANSIENT AND REMOVABLE INFLECTION POINT

BACKGROUND

The present disclosure relates to middleware and common services and, more specifically, to a system and method for providing a transient and removable inflection point.

In an enterprise or organization, a user may desire to control a behavior of a program. In order to control the behavior, the user may have to modify the program or, more specifically, change code relevant to the behavior in the program. However, the program may have been developed by a third party that does not desire to have the code modified since the third party may be required to support or maintain the program for at least some period of time. Thus, with many existing systems and methods, the user may prefer that no modifications of the code be performed.

In more sophisticated cases, the third party may provide an interface within the program for the user. The interface may allow the user to control one or more behaviors of the program. Unfortunately, if the user is interested in a particular behavior and the interface does not allow the user to control that particular behavior, then the user may have to resort to modifying the program, which, as described above, may not be desired.

BRIEF SUMMARY

According to an aspect of the present disclosure, a method may comprise identifying when a first event associated with a program occurs. The method may comprise determining whether to control a behavior of the program when the first event occurs. The method may comprise identifying a location in a memory to add an inflection point in response to determining to control the behavior of the program. The memory may comprise a loaded version of the program. The inflection point may comprise an instruction corresponding to the behavior. The method may comprise adding the inflection point to the memory at the identified location.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
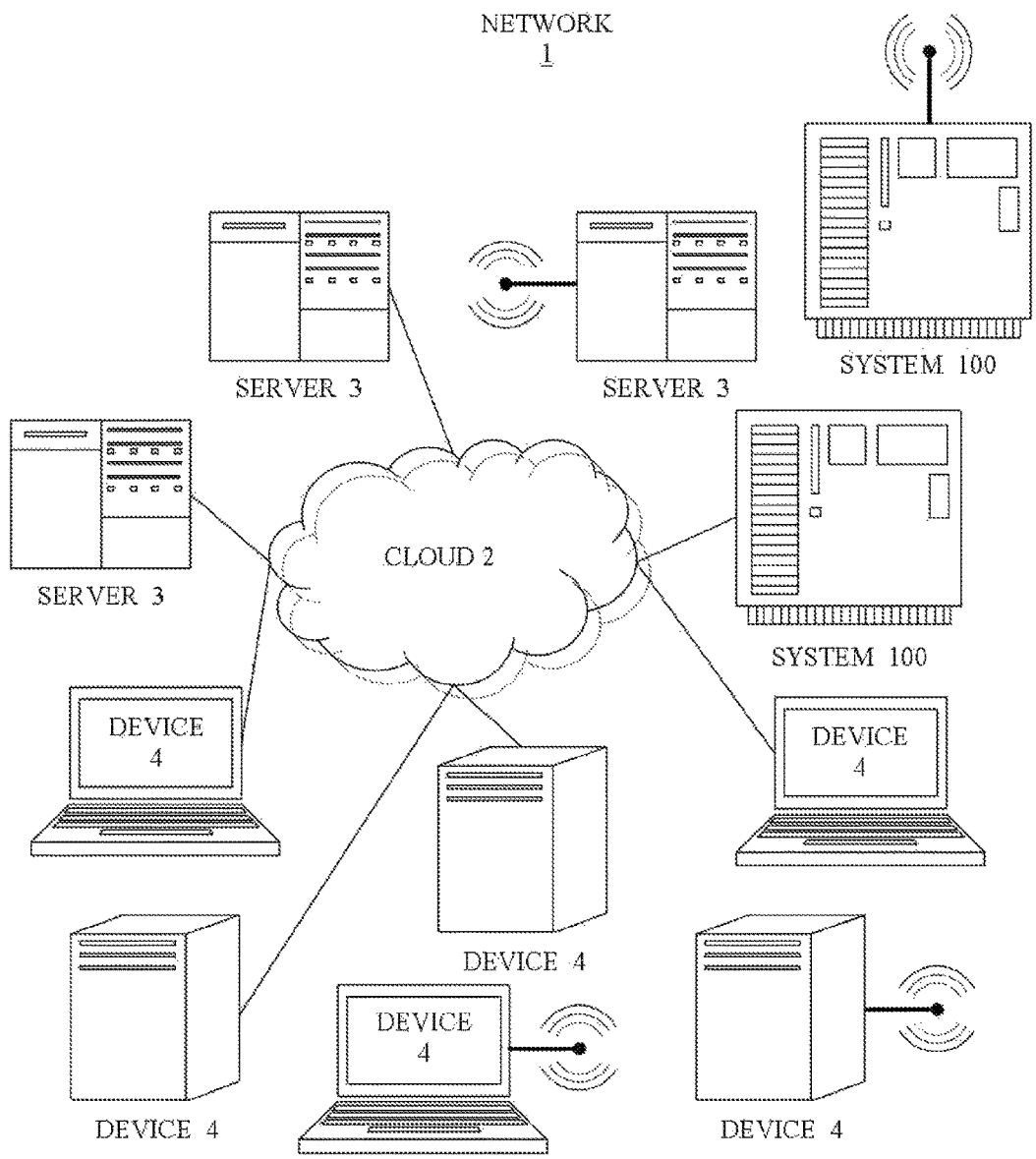
FIG. 1 is a schematic representation of a network 1 monitored by a device for providing a transient and removable inflection point.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to middleware and common services, systems and methods disclosed herein may be related to one or more of infrastructure and operations management, security management, and storage and recovery management. More specifically, systems and methods disclosed herein may be associated with client management solutions in infrastructure and operations management, dynamic and virtual systems management in infrastructure and operations management, data leakage protection in security management, security information management in security management, file backup in storage and recovery management, high availability in storage and recovery management, as well as other areas in infrastructure and operations management, security management, and storage and recovery management. Systems and methods disclosed herein may be applicable to a broad range of applications that are associated with various disciplines, such as, for example, IT systems (e.g., performance monitoring, utilization monitoring, security controls, provisioning services) and other activities of importance to the user.

Referring now to middleware and common services systems, in an enterprise or organization, a user may desire to control a behavior of a program. The user may be an end user or an administrator. The program may be a third party program or a program that has been developed by a third party or is owned by the third party. For example, the user may have purchased the program from the third party or, alternatively, the user may have licensed the program from the third party. The policy may comprise one or more operations of the program. The user may want to gain control of the behavior in order to understand or control the behavior so that the user may coordinate with other users, other third parties, and other functions and features of the system.

In some instances, the user may want to gain control when an event (e.g., loading, transient loading, unloading) associated with the program is initiating or has already taken place. In such instances, the user may want to be notified when the event occurs, or, alternatively, the user may want the system to give the user control over the behavior when the event occurs. Some existing systems and methods may provide the user with this control. For example, the third party may have included an exit point or interface in the program. The interface may allow the user to control the behavior when the event occurs. As another example, the third party may permit the user to modify the program. However, in instances where the third party does not provide an interface and does not allow for modification of the program, the user may find it difficult to control the behavior. The third party may not desire to have the program modified since the third party may be required to support or maintain the program for at least some period of time. In such instances, the user may prefer that no modifications of the code be performed.

Systems and methods disclosed herein may provide a means for controlling a behavior or activity of a program. A device may load and run the program. Such systems and methods may use a control point or inflection point (described below) to add an instruction at a location where the user needs to gain control of a program. The inflection point may be used to ensure that the behavior of the program is addressed to a particular standard (e.g., coordinates with another product) before any action is taken by the device.

The inflection point may comprise an instruction that modifies the behavior. Thus, such systems and methods may use the inflection point by adding the inflection point to the program. Moreover, such systems and methods may look for a first event before adding an inflection point. For example, such systems and methods may add the inflection point to the program after the device loads the program for execution. Such systems and methods may allow the device to load the program into a memory but will subsequently add the inflection point to the memory at an identified location. By adding the inflection point to a loaded version of the program (described below) in the memory, such systems and methods may keep the inflection point transient or not permanent.

Systems and methods disclosed herein may also remove the inflection point after a second event has occurred. For example, such systems and methods may remove the inflection point before the program terminates or stops running on the device. Because the inflection point was added after the device loaded the program into the memory, such systems and method may remove the inflection point in such a way that there is no indication that the program was ever modified. Alternatively, such systems and methods disclosed herein may wait for the device to unload the program (i.e., remove the program from the memory), resulting in the removal of the inflection point. After the program is unloaded, the inflection point may no longer be available until the program is subsequently reloaded and a new inflection point is added to the memory where a reloaded version of the program resides.

In addition to looking for a first event and a second event, such systems and methods may check in with a user after a first event or a second event has been identified. For example, if a first event or a second event is identified, such systems and methods may ask the user whether he is interested in the event, how he would like to obtain control (e.g., which behavior he would like to control, how he would like to control the behavior), what he would like to do after he obtains control, or how he would want to remove his control.

Because the inflection points described above are transient and can be removed, these inflection points may be referred to as "transient and removable inflection points." The transient and removable inflection points may allow users to control a number of interesting features and functions in a system. For example, these transient and removable inflection points may allow a user to standardize how the system handles security checks. There may be many programs or products within the system. Each of these programs may have been developed by a different third party, and each may have its own security policy. With existing systems and methods, the user may find it difficult to standardize all of these security policies; specifically, the user may have to modify each of the programs individually. Alternatively, the user may rely on using transient and removable inflection points. A central security manager may monitor one or more devices that may load or run the programs. If the central security manager identifies a first event corresponding to one of the programs (e.g., a device in the one or more devices that loads one of the programs), the central security manager may use a transient and removable inflection point to modify the security policy of that one program such that it is standardized. Thus, if an enterprise or group using the system would like to give an employee the authority to view certain personal data of the company's employees (e.g., addresses, social security numbers), then the enterprise may define a standardized security policy for the central security manager to put in place. The central security manager may monitor each of the programs for compliance with the standardized security policy and use transient and removable inflection points to ensure that the security policy of each program is addressed to the standardized security policy.

As another example, the transient and removable inflection points may allow a user to perform version control for a particular document that is used among a plurality of programs. Similar to the last example, each of these programs may have been developed by a different third party, and each may have its own version control policy. A central file manager may then perform similar monitoring and control functions as the central security manager described above.

In systems and methods described herein, a user may gain control of a program before, during, or after certain events have occurred. The user may want to gain control of the program in order to control a behavior of the program. The behavior may comprise a policy such as a security policy or a version control policy. Such systems and methods may allow the user to gain control without permanently modifying or altering the program. Instead, such systems and methods may only add a transient and removable inflection point to a loaded version of the program that is currently running on a device. Moreover, such systems and methods may allow for more central control by an enterprise of a plurality of programs.

Referring now to FIG. 1, a network 1 monitored by a device for providing a transient and removable inflection point now is described. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information and provisioning of services among users that are connected to cloud 2.

Network 1 may comprise one or more servers 3 and other devices operated by service providers, information providers, and other parties. Network 1 also may comprise one or more devices 4 utilized by service consumers, information consumers, and other parties. Service providers and information providers may provide information and services to information consumers and service consumers utilizing the one or more servers 3, which connect to the one or more devices 4 via cloud 2. The services may comprise, for example, information technology services, infrastructure services, operations services, security services, monitoring services, storage services, recovery services, and other resource-provisioning services. Servers 3 may comprise, for example, one or more of general purpose computing devices, specialized computing devices, mainframe devices, wired devices, wireless devices, monitoring devices, infrastructure devices, and other devices configured to provide one or more of services and information to information consumers and service consumers. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service consumers and information consumers. Items may include network 1, cloud 2, servers 3, and devices 4.

Moreover, network 1 may comprise one or more system 100 that may collect information from and about network 1, cloud 2, servers 3, devices 4, and other devices connected to cloud 2. System 100 may be, for example, one or more of a general purpose computing device, a specialized computing device, a wired device, a wireless device, a mainframe device, an infrastructure device, a monitoring device, and any other device configured collect data from one or more data sources (e.g., servers, sensors, networks, interfaces, other devices). System 100 may connect to cloud 2 and monitor network 1, cloud 2, servers 3, devices 4, and other devices connected to cloud 2 for available information (e.g., operating information, performance information, error information, utilization, availability, and other variable information) about items including network 1, cloud 2, servers 3, devices 4, and other items connected to cloud 2 and existing in network 1, cloud 2, servers 3, devices 4, and other items connected to cloud 2. By collecting variable data associated with network 1, cloud 2, servers 3, devices 4, and other devices connected to cloud 2, system 100 may provide users with control over one or more behaviors of a program. System 100 may identify when events of interest occur and use one or more inflection points (described below) to control the one or more behaviors. In this manner, system 100 may serve as a central behavior manager that manages network 1, cloud 2, servers 3, devices 4, other items connected to cloud 2, and other systems, services, and processes monitored by such items.

In some configurations, one or more of servers 3 and devices 4 may comprise system 100. In other configurations, system 100 may be separate from servers 3 and devices 4.

Figure 2:
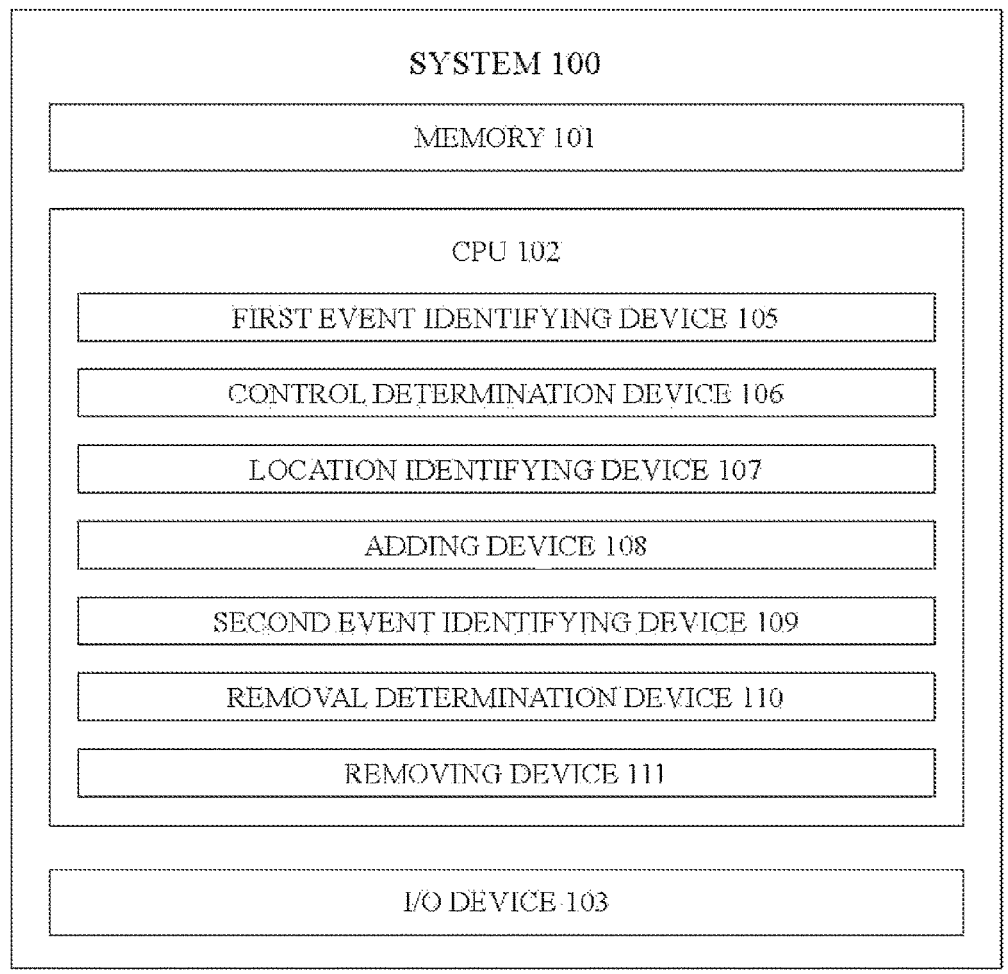
FIG. 2 is a schematic representation of a system configured to provide a transient and removable inflection point.

Referring now to FIG. 2, system 100, which may provide a transient and removable inflection point, now is described. System 100 may comprise a memory 101, a central processing unit ("CPU") 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of a first event identifying device 105, a control determination device 106, a location identifying device 107, an adding device 108, a second event identifying device 109, a removal determination device 110, and a removing device 111. In particular configurations, one or more of first event identifying device 105, control determination device 106, location identifying device 107, adding device 108, second event identifying device 109, removal determination device 110, and removing device 111 may be implemented on one or more different CPUs, which may be comprised in remote or local devices.

I/O device 103 may receive one or more of: data from cloud 2; data from other devices and sensors connected to system 100; and input from a user, and provide such information to CPU 102. I/O device 103 may transmit data to cloud 2, may transmit data to other devices connected to system 100, and may transmit a notification to a user (e.g., display a message, make a sound, send an email, make a telephone call). Further, I/O device 103 may implement wireless or wired communication between system 100 and other devices.

Figure 3:
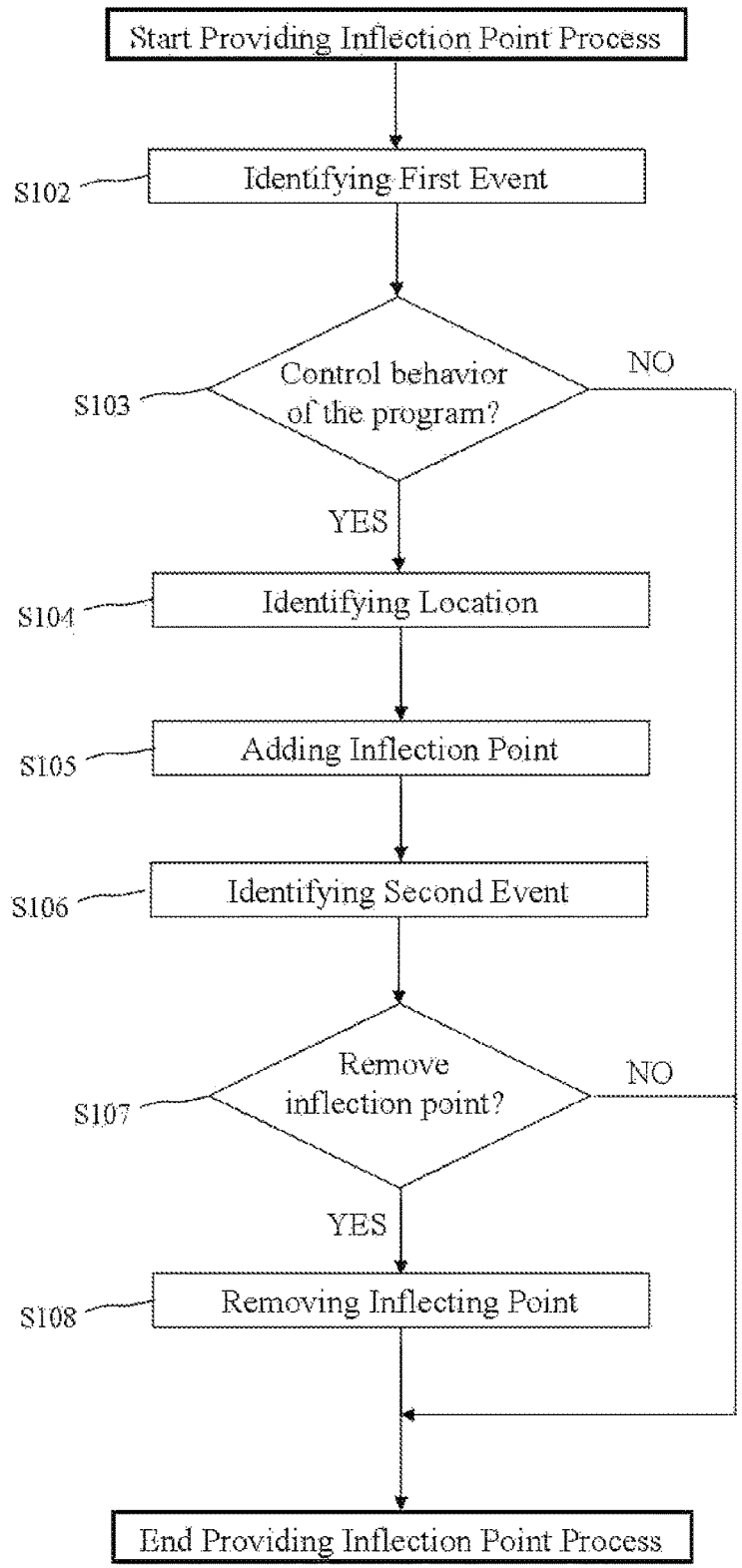
FIG. 3 illustrates a process of identifying when a first event occurs, determining whether to control a behavior of a program when the first event occurs, adding an inflection point, identifying when a second event occurs, determining whether to remove the inflection point when the second event occurs, and removing the inflection point.

Referring now to FIG. 3, a process performed by first event identifying device 105, control determination device 106, location identifying device 107, adding device 108, second event identifying device 109, removal determination device 110, and removing device 111 now is described. FIG. 3 depicts a process of providing an inflection point. In S102, first event identifying device 106 may identify when a first event associated with a program occurs. The program may be a sequence of instructions that, when executed by a computer, may cause the computer to perform one or more operations. The program may comprise a dynamic-link library ("DLL") file, a Java class file, a statically or dynamically bound executable file, or other type of executable file. Examples of programs include system programs (e.g., operating systems ("OS")), application programs (e.g., enterprise management programs, financial management programs, personnel management programs), utility programs (e.g., service update programs, file backup programs), entertainment programs (e.g., video game programs, media player programs), communications programs (e.g., email programs, instant message programs, chat programs, automated voice recognition programs), and analytics programs (e.g., data mining programs, correlation programs, and analytics programs). Identifying when the first event associated with a program occurs may comprise identifying when the first event initiates, identifying a point during which the first event is ongoing, or identifying when the first event finishes. Identifying a point during which the first event is ongoing may comprise identifying a time after the first event has initiated or identifying a time before the first event will finish. For example, first event identifying device 106 may identify a point corresponding to a number of seconds or minutes after the first event has initiated. Alternatively, first event identifying device 106 may identify a point corresponding to a number of seconds or minutes before the first event will finish. The first event may comprise a first device loading a program into a memory (described below), a second device performing an operation, a third device calling the policy, and a fourth device invoking a service in a secondary device. The first device, the second device, the third device, and the fourth device may comprise devices 4 or other devices that are associated with the program or controlled by the program. For example, the device may comprise a computer that is loading the program into its memory. Alternatively, the program may be a media player program and it may control a media player device such as a DVD player. With respect to the first device, loading a program into a memory may comprise static loading, dynamic loading, or transient loading. Loading a program into the memory may also be referred to as "booting" or "bootstrapping." With respect to the second device, performing an operation may comprise, for example, powering on, powering off, initiating a web service (e.g., initiating a call to a REST interface or initiating a RESTful interface call), performing actions with a file (e.g., opening a file, reading a file, displaying a file), as well as performing other actions that are controlled by a program. As a specific example, with the media player device above, performing an operation may comprise loading a media file or playing a media file. With respect to the fourth device, invoking a service in a secondary device may comprise initiating a service, wherein initiating the service causes a secondary device to perform the service.

In S103, control determination device 106 may determine whether to control a behavior of the program when the first event occurs. The behavior may comprise a policy, wherein the policy comprises one or more operations of the program. Examples of a policy may include a security policy, a version control policy, a response to an out of memory (OOM) state, a policy that enhances or automates a response to an error condition, an authentication policy, and an audit policy. The security policy may define how a program handles a security check. For example, a security policy may require a user to enter a username and a password in order to use the program. As another example, a security policy may require a user to enter a username, a password, and a security key between the hours of 8:30 a.m. and 4:30 p.m. in order to have access to certain features of the program. The version control policy may define how a program manages changes to a file. For example, a version control policy may assign a different number to each version of a file. As another example, a version control policy may assign a date to each version of the file, wherein the date corresponds to a date that each version of the file is created. The response to an OOM state may define how a program responds when a memory is full (i.e., a memory does not have any available space). The memory may comprise the loaded version of the program, and the program may need to load additional data into the memory in order to perform a particular operation. Thus, if the memory is full, then such a response may comprise instructing a device to unload the program from the memory. Alternatively, such a response may also comprise removing other data from the memory in order to create available space. The policy that enhances or automates a response to an error condition may define how a program responds to an error condition. And, the audit policy may define one or more requirements that a program has to satisfy in order to pass a program audit or application audit.

In certain configurations, determining whether to control a behavior of the program may comprise transmitting a first message to a user. The first message may comprise a question that asks the user whether the user is interested in controlling the behavior. Determining whether to control the behavior may further comprise receiving a second message from the user, wherein the second message may comprise a response to the question. Control determination device 106 may then determine whether the response corresponds to a confirmation to control the behavior. In other configurations, determining whether to control a behavior of the program may comprise consulting a control reference that defines when control determination device 106 should determine to control the behavior. The control reference may comprise a document, a table, or other file. For example, the control reference may be a document which states that control determination device 106 should only determine to control the behavior when the first event comprises a particular device powering on. Consequently, if the first event does not comprise that particular device powering on, then control determination device 106 may not determine to control the behavior.

When control determination device 106 determines to control the behavior of the program (S103: YES), the process may proceed to S104. When control determination device 106 determines not to control the behavior of the program (S103: NO), the process may terminate. In S104, location identifying device 107 may identify a location in a memory to add an inflection point. The memory may be volatile memory such as, for example, random-access memory ("RAM"). The memory may comprise a loaded version of the program. The loaded version of the program may be a version or copy of the program that a device has created. Such device may have created the loaded version of the program when the device loaded or read the program into the memory. The inflection point may modify a policy of the program by putting in place a standardized policy. The standardized policy may be a user-defined policy, an enterprise-defined policy, or a policy of a different program. The instruction may be an inline instruction, a branch configured to call a secondary program, a program interrupt, a supervisor call instruction, a system call instruction, or a far call instruction. The inline instruction may comprise code that, when executed by a computer, may cause the computer to perform one or more operations according to the standardized policy. The branch may comprise code that, when executed by a computer, may cause the computer to branch to a secondary program. The secondary program may comprise code that may cause the computer to perform one or more operations according to the standardized policy. The program interrupt may comprise code that, when executed by a computer, may cause the computer to stop executing the program. The computer may transmit a notification (e.g., display a message, make a sound) to a user; the notification may inform the user that the first event has occurred. The user may then instruct the computer to perform one or more operations before resuming execution of the program. The supervisor call instruction may comprise code that, when executed by a computer, may cause the computer to perform a supervisor call. Performing a supervisor call may comprise stopping execution of the program and passing control to a supervisory program or supervisor, wherein the supervisor program may be a program that controls the execution of other programs. The system call instruction may comprise code that, when executed by a computer, may cause the computer to perform a system call. Performing a system call may comprise stopping execution of the program and passing control to a system. Alternatively, performing a system call may comprise causing a system to implement a service.

In S105, adding device 108 may then add the inflection point to the memory at the identified location. The identified location may comprise a place in the memory that stores the loaded version of the code. More specifically, the identified location may comprise a particular spot in the loaded version of the code that the inflection point may be added in order to achieve its effect.

In S106, second event identifying device 109 may identify when a second event associated with the program occurs. The second event may comprise a device having an error. As described above, the device may comprise devices 4 or other devices that are associated with the program or controlled by the program. For example, the device may comprise a computer that is executing the program. After the inflection point is added, the computer may experience an error. The error may comprise a syntax error, a logical error, a run-time error, or another type of error. Examples of errors include a communications error, an authentication failure, and an authorization check failure. As a specific example, the device may comprise a media player device such as a DVD player. The media player device may be controlled by a media player program that is being executed by a computer. After the inflection point is added, the media player device may experience an error such as error playing video or error playing audio. The second event may also comprise the memory being insufficient for a request. The request may comprise loading another program into the memory and loading additional data into the memory. The memory may be insufficient for the request because the memory does not have any available space or because the request requires an amount of space that exceeds the available space that the memory has.

Then in S107, removal determination device 110 may determine whether to remove the inflection point when the second event occurs. In certain configurations, determining whether to remove the inflection point may comprise transmitting a first message to a user. The first message may comprise a question that asks the user whether the user is interested in removing the inflection point. Determining whether to remove the inflection point may further comprise receiving a second message from the user, wherein the second message may comprise a response to the question. Removal determination device 110 may then determine whether the response corresponds to a confirmation to remove the inflection point. In other configurations, determining whether to remove the inflection point may comprise consulting a removal reference that defines when removal determination device 110 should determine to remove the inflection point. The removal reference may comprise a document, a table, or other file. For example, the removal reference may be a document which states that removal determination device 110 should only determine to remove the inflection point when the second event comprises a particular device having an error. Consequently, if the second event is not the particular device having an error, then removal determination device 106 may not determine to remove the inflection point.

When removal determination device 110 determines to remove the inflection point (S107: YES), the process may proceed to S108. When removal determination device 110 determines not to remove the inflection point (S107: NO), the process may terminate. Then, in S108, removing device 111 may remove the inflection point in response to determining to remove the inflection point. Removing the inflection point may comprise deleting the inflection point from the memory. Alternatively, removing the inflection point may comprise deleting the loaded version of the program having the inflection point from the memory and subsequently reloading the program to the memory. The memory may then comprise a loaded version of the program that does not have the inflection point.

In certain configurations S106 through S108 may be omitted.

Figure 4A:
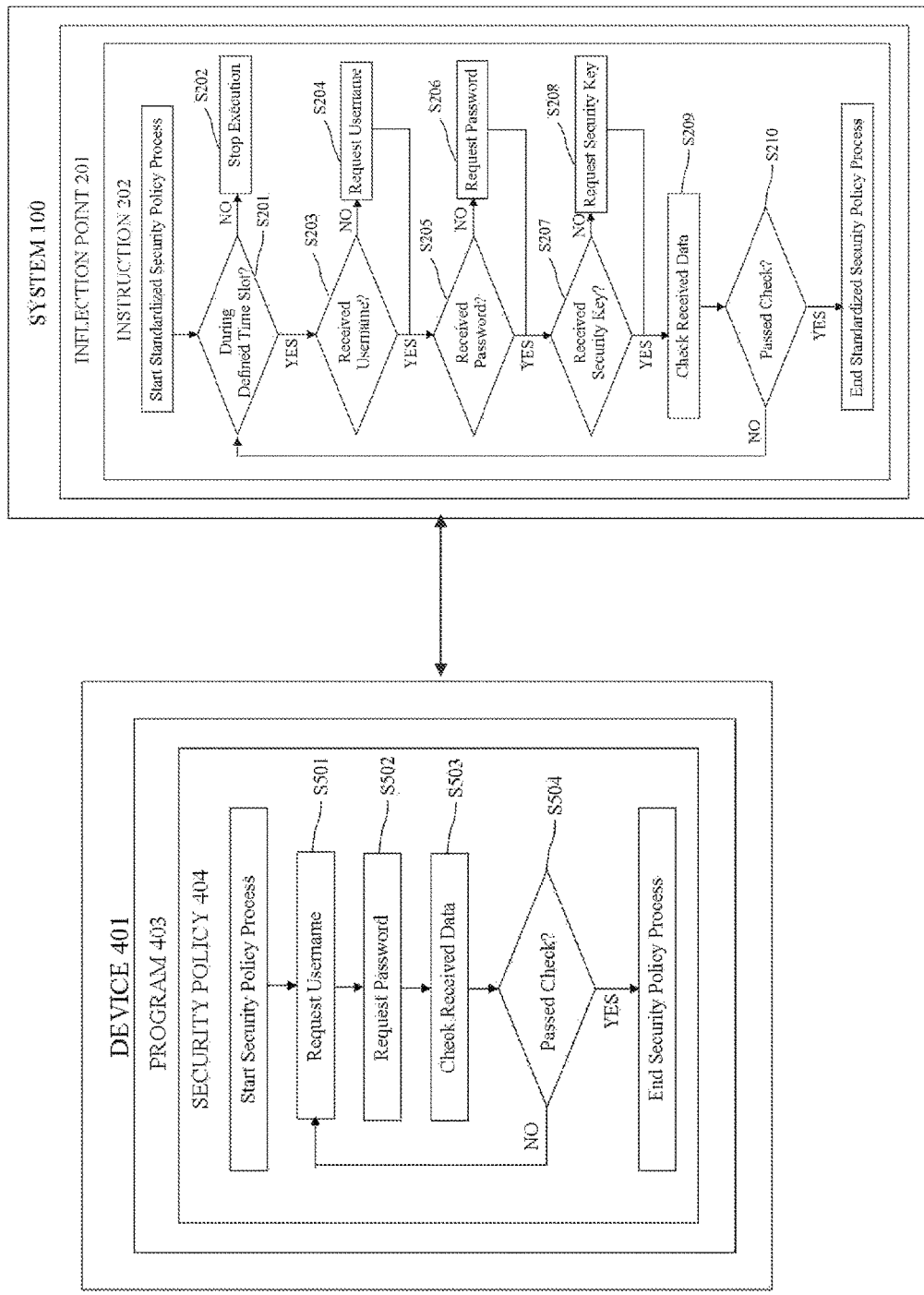
FIGS. 4A-4C depict an examples of providing an inflection point in the context of a security policy, wherein the inflection point comprises an instruction configured according to an embodiment of the invention.
Figure 4B:
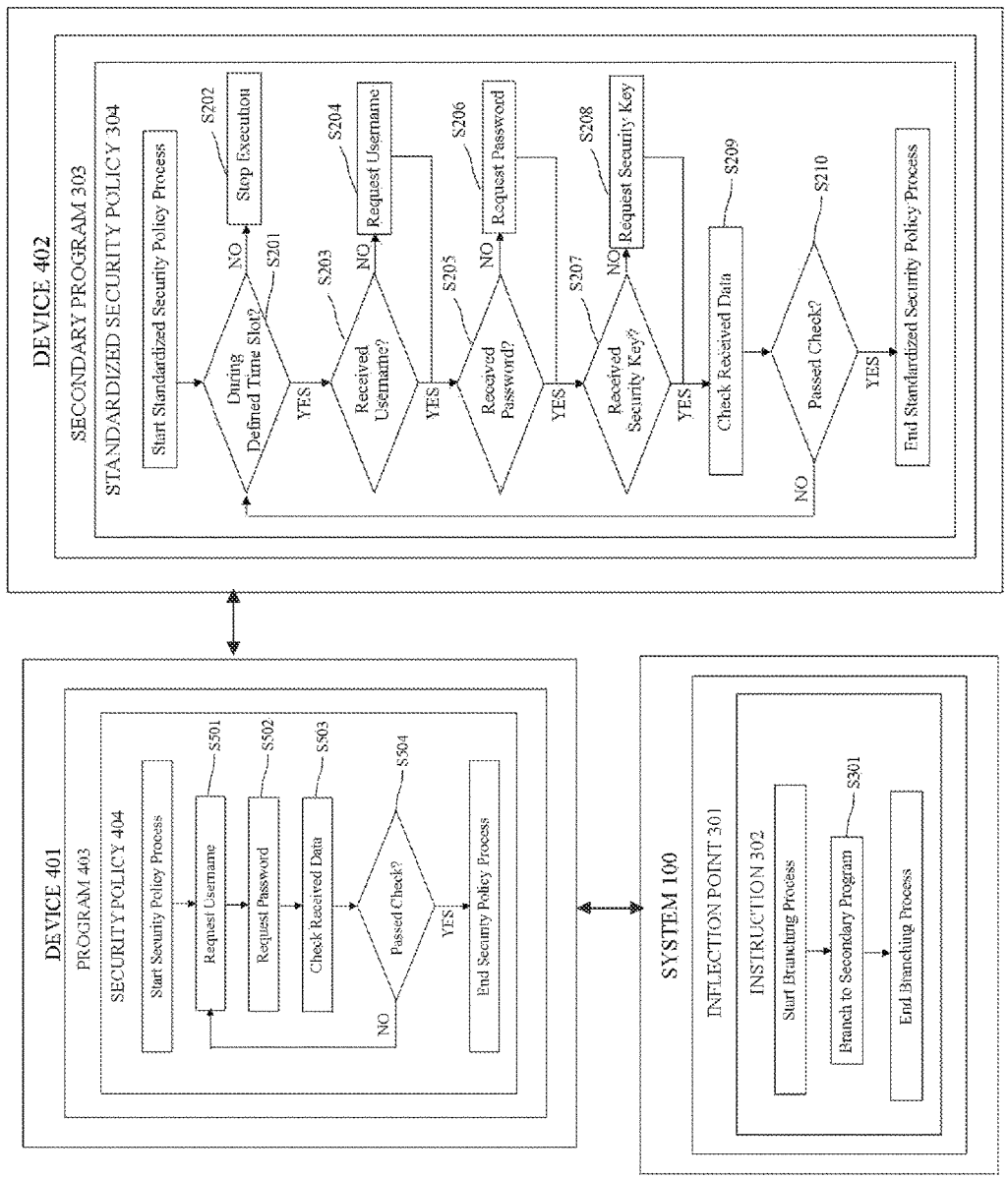
Figure 4C:
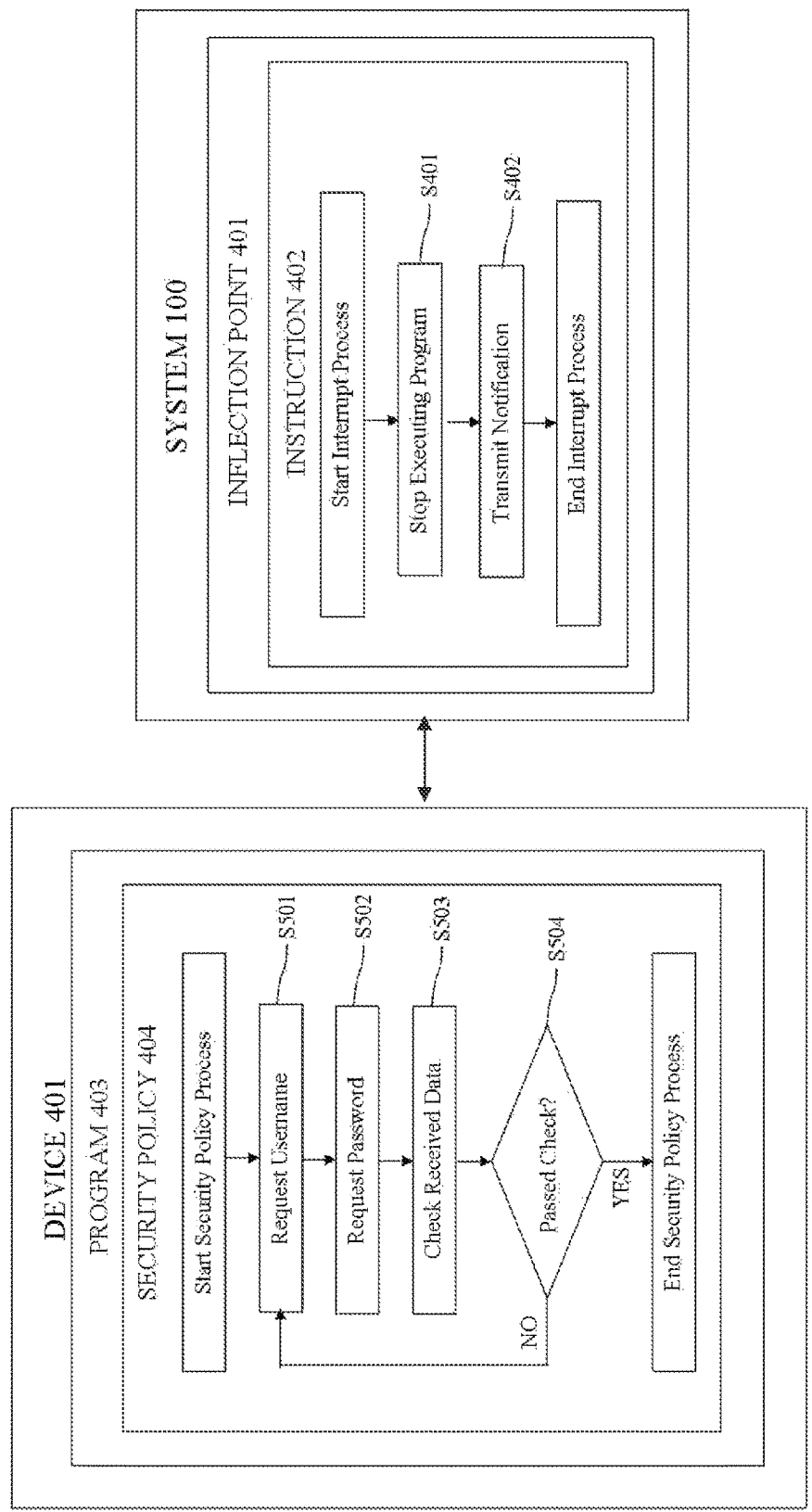

FIGS. 4A-4C depict examples of providing an inflection point in the context of a security policy, wherein the inflection point comprises an instruction configured according to an embodiment of the invention. In FIG. 4A, a system 100 may comprise an inflection point 201, wherein inflection point 201 may comprise an instruction 202. Instruction 202 may be an inline instruction. The inline instruction may comprise a first set of code that, when executed by a computer, may cause the computer to perform a first set of operations according to a standardized security policy. In FIG. 4A, this first set of operations is represented by S201-S210. Moreover, in FIG. 4A, a device 401 may comprise a program 403, wherein program 403 may comprise a security policy 404. Security policy 404 may comprise a second set of code, that when executed by a computer, may cause the computer to perform a second set of operations. This second set of operations is represented by S501-S504.

In FIG. 4A, system 100 may identify a first event associated with program 403. As an example, the first event may comprise device 401 loading program 403 into a memory, and system 100 may identify when such loading finishes. After system 100 identifies when the first event occurs, system 100 may determine whether to control security policy 404 of program 403. As described above, system 100 may transmit a first message to a user, the first message comprising a question that asks the user whether the user is interested in controlling security policy 404; receive a second message from the user, the second message comprising a response to the question; and then determine whether the response corresponds to a confirmation to control security policy 404. For example, the question in the first message that is transmitted by system 100 may be "Would you like to control security policy 404?"; and the response in the second message that is received by system 100 may be "Yes," which may correspond to the confirmation to control security policy 404. Alternatively, system 100 may consult a control reference that defines when it should determine to control security policy 404.

If system 100 determines to control security policy 404, then system 100 may identify a location in the memory of device 401 to add inflection point 201. The memory may comprise a loaded version of program 403. As described above, the location may comprise a particular spot in the loaded version of the code that the inflection point may be added in order to achieve its effect (i.e., in order to control security policy 404). As an example, system 100 may identify a spot immediately following the second set of code to add inflection point 201. After identifying the particular spot, system 100 may then add inflection point 201 to the particular spot.

If system 100 adds inflection point 201 after it identified that device 401 had finished loading 403 into the memory, then after inflection point 201 is added to the memory, device 401 may begin to execute program 403. Continuing from the last example, if inflection point 201 was added to the memory at a spot immediately following the second set of code, then device 401 would first encounter the second set of code. When device 401 executes the second set of code, device 401 may request a username in S501, request a password in S502, and check the username and the password that are received (i.e., the received data) in S503. Checking the username and the password may comprise referring to a database with login data, wherein the login data may certify whether the username and the password are sufficient. For example, if the username and the password match a data entry in the database, then the username and the password may be sufficient. If the username and the password are sufficient, then the username and the password pass the check. When device 401 determines that the username and the password pass the check (S504: YES), then the process may terminate. When device 401 determines that the username and the password do not pass the check (S504: NO), then the process may proceed back to S501. In certain other configurations, if device 401 determines that the username and the password do not pass the check (S504: NO), device 401 may stop execution of program 403.

Device 401 may then encounter inflection point 201, which comprises instruction 202. When device 401 executes the first set of code comprised in instruction 202, device 401 may first determine whether program 403 is currently being executed during a defined time slot. The defined time slot may comprise at least one of a number of hours during a day (e.g., 8:30 a.m. to 4:30 p.m.), a number of days (e.g., Jan. 1, 2013 to Jan. 5, 2013), a number of days of a week (e.g., Monday and Wednesday), as well as other measures of time. If device 401 determines that program 403 is being executed during the defined time slot (S201: YES), then the process may proceed to S203. If device 401 determines that program 403 is not being executed during the defined time slot (S201: NO), then the process may proceed to S202 and device 401 may stop execution of program 403. In S203, device 401 may determine whether it has already received a username. If device 401 determines that it has received the username (S203: YES), then device 401 may proceed to S205. In this example, since device 401 has already executed the first set of code, it may have already received the username. Otherwise (S203: NO), device 401 may proceed to S204 and request the username. In S205, device 401 may determine whether it has already received a password. If device 401 determines that it has received the password (S205: YES), then device 401 may proceed to S207. In this example, since device 401 has already executed the first set of code, it may have already received the password. Otherwise (S205: NO), device 401 may proceed to S206 and request the password. In S205, device 401 may determine whether it has already received a security key. If device 401 determines that it has received the security key (S207: YES), then device 401 may proceed to S207. Otherwise (S207: NO), device 401 may proceed to S208 and request the security key. In S209 and S210, device 401 may perform steps that are similar to S503 and S504. However, in S209 and S210, device 401 may not only check the username and the password but may also check the security key. When device 401 determines that the username, the password, and the security key pass the check (S210: YES), then the process may terminate. After the process terminates, device 401 may continue executing the program. When device 401 determines that the username, the password, and the security key do not pass the check (S210: NO), then the process may proceed back to S201. In certain other configurations, if device 401 determines that the username and the password do not pass the check (S210: NO), device 401 may stop execution of program 403.

In FIG. 4A, system 100 may also identify when a second event associated with program 403 occurs. As an example, the second event may comprise device 401 having an error after inflection point 201 has been added. If system 100 identifies when a second event occurs, then system 100 may determine whether to remove inflection point 201 from the memory. As described above, system 100 may transmit a first message to a user, the first message comprising a question that asks the user whether the user is interested in removing inflection point 201; receive a second message from the user, the second message comprising a response to the question; and then determine whether the response corresponds to a confirmation to remove inflection point 201. For example, the question in the first message that is transmitted by system 100 may be "Would you like to remove inflection point 201?"; and the response in the second message that is received by system 100 may be "Yes," which may correspond to the confirmation to remove inflection point 201. Alternatively, system 100 may consult a removal reference that defines when it should determine to remove inflection point 201.

If system 100 determines to remove inflection point 201, then system 100 may remove inflection point 201.

Moving now to FIG. 4B, in FIG. 4B, there may also exist a system 100 and a device 401. Device 401 in FIG. 4B may be the same device as device 401 in FIG. 4A. System 100 in 4B may be similar to system 100 in FIG. 4A; however, system 100 may now comprise an inflection point 301, wherein inflection point 301 may comprise an instruction 302. Instruction 302 may be a branch configured to call a secondary program 303. The branch may comprise a third set of code that, when executed by a computer, may cause the computer to branch to secondary program 303. The is represented by S301.

In FIG. 4B, secondary program 303 may be located in a device 402. Secondary program 303 may comprise a standardized security policy 304, wherein standardized security policy 304 may comprise code that may cause the computer to perform a set of operations according to a standardized security policy. The set of operations may be the same as the first set of operations in FIG. 4A above. In certain other configurations, secondary program 303 may be located in device 401. In even other configurations, secondary program 303 may be located in another device. Device 402 and any other device that may comprise secondary program 303 may be connected device 401 such that device 401 may have access to secondary program 303 (i.e., be able to branch to secondary program 303).

In all other respects, the example in FIG. 4B is the same as the example in FIG. 4A, only that device 401 would encounter inflection point 301 instead of inflection point 201. When device 401 encounters inflection point 301, it may execute the third set of code. The third set of code may instruct device 401 to branch to secondary program 303, whether it is located in device 401, device 401, or another device.

Turning last to FIG. 4C, in FIG. 4C, there may also exist a system 100 and a device 401. Device 401 in FIG. 4C may be the same device as those devices 401 in FIGS. 4A and 4B. System 100 in 4C may be similar to those systems 100 in FIGS. 4A and 4B; however, system 100 may now comprise an inflection point 401, wherein inflection point 401 may comprise an instruction 402. Instruction 402 may be a program interrupt. The program interrupt may comprise a fourth set of code that, when executed by a computer, may cause the computer to stop executing a program 403 and transmit a notification (e.g., display a message, make a sound) to a user. This is represented by S401-402. The notification may inform the user that a first event has occurred. In certain cases, the user may then instruct the computer to perform a third set of operations before resuming execution of program 403. This third set of operations may be the same as the first set of operations. In other cases, the user may not instruct the computer to perform any operations, and thus device 401 may never resume execution of program 403.

The inflection points that are described in FIG. 1-4C may be referred to as a "transient and removable inflection point" because the inflection point is transient and removable.

The flowchart and diagrams in FIGS. 1-4C illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
   identifying when a first event associated with a program occurs;
   determining whether to control a security authorization feature of the program according to a security policy when the first event occurs, based at least in part on whether attributes of the first event fulfill a set of criteria enumerated in the security policy;
identifying a location in a memory to add an inflection point in response to determining that the first event fulfills the set of criteria, the memory comprising a loaded version of the program, the inflection point comprising an instruction initiating temporary external control of the security authorization feature of the program; and
adding the inflection point to the memory at the identified location.

2. The method of claim 1, wherein the security authorization feature comprises a policy that is selected from the group comprising: a security policy, a version control policy, a response to an out of memory (OOM) state, and an audit policy.

3. The method of claim 1, wherein the program comprises a first program, and:
wherein identifying when the first event associated with the program occurs comprises at least one of identifying when the first event initiates, identifying a point during which the first event is ongoing, and identifying when the first event finishes; and
wherein the first event comprises at least one of a device loading a second program into the memory, a device performing an operation, a device calling the policy, and a device invoking a service of a secondary device.

4. The method of claim 1, wherein the instruction is selected from the group comprising: an inline instruction, a branch configured to call a secondary program, a program interrupt, a supervisor call instruction, a system call instruction, and a far call instruction.

5. The method of claim 1, wherein the program is selected from the group comprising: an operating system ("OS"), an enterprise management program, a financial management program, a personnel management program, a utility program, a communication program, and a database program.

6. The method of claim 1, further comprising:
determining that a device running the program has insufficient memory to process a request;
in response to determining that the device running the program has insufficient memory to process the request:
removing the inflection point from the program.

7. The method of claim 1, wherein determining whether to control the behavior of the program when the first event occurs comprises:
transmitting a message to a user to determine whether the user would like to control the program; and
receiving a response to the message, from the user.

8. A system comprising a processor configured to function as:
a first identifying device configured to identify an occurrence of a first event associated with a program;
a first determining device configured to, in response to the occurrence of the first event, determine whether to control a security authorization feature of the program according to a security policy, based at least in part on whether attributes of the first event fulfill a set of criteria enumerated in the security policy;
a second identifying device configured to, in response to the occurrence of the first event and to determining that the first event fulfills the set of criteria, identify a location in a memory to add an inflection point, the memory comprising a loaded version of the program, the inflection point comprising an instruction initiating temporary external control of the security authorization feature of the program; and
an adding device configured to add the inflection point to the memory at the identified location.

9. The system according to claim 8, wherein the security authorization feature comprises a policy that is selected from the group comprising: a security policy, a version control policy, a response to an out of memory (OOM) state, and an audit policy.

10. The system according to claim 8, wherein the program comprises a first program, and:
wherein the first identifying device comprises at least one of a first identifying device configured to identify when the first event initiates, a first identifying device configured to identify a point during which the first event is ongoing, and a first identifying device configured to identify when the first event finishes; and
wherein the first event comprises at least one of a device loading a second program into the memory, a device performing an operation, a device calling the policy, and a device invoking a service of a secondary device.

11. The system according to claim 8, wherein the instruction is selected from the group comprising: an inline instruction, a branch configured to call a secondary program, a program interrupt, a supervisor call instruction, a system call instruction, and a far call instruction.

12. The system according to claim 8, wherein the program is selected from the group comprising: an operating system ("OS"), an enterprise management program, a financial management program, a personnel management program, a utility program, a communication program, and a database program.

13. The system of claim 8, further comprising:
a second determining device configured to determine that a device running the program has insufficient memory to process a request; and
a removing device configured to, in response to determining that the device running the program has insufficient memory to process the request, remove the inflection point from the program.

14. A computer program product comprising:
a computer readable storage medium having computer readable program code embodied therewith, the computer readable program code comprising:
computer readable program code configured to identify when a first event associated with a program occurs;
computer readable program code configured to determine whether to control a security authorization feature of the program according to a security policy when the first event occurs, based at least in part on whether attributes of the first event fulfill a set of criteria enumerated in the security policy;
computer readable program code configured to identify a location in a memory to add an inflection point in response to determining that the first event fulfills the set of criteria, the memory comprising a loaded version of the program, the inflection point comprising an instruction initiating temporary external control of the security authorization feature of the program; and
computer readable program code configured to add the inflection point to the memory at the identified location.

15. The computer program product according to claim 14, wherein the program comprises a first program, and:
wherein the computer readable program code configured to identify when the first event occurs comprises at least one of computer readable program code configured to identify when the first event initiates, computer readable program code configured to identify a point during which the first event is ongoing, and computer readable program code configured to identify when the first event finishes; and wherein the first event comprises at least one of a device loading a second program into the memory, a device performing an operation, a device calling the policy, and a device invoking a service of a secondary device.

16. The computer program product according to claim 14, wherein the instruction is selected from the group comprising: an inline instruction, a branch configured to call a secondary program, a program interrupt, a supervisor call instruction, a system call instruction, and a far call instruction.

17. The computer program product according to claim 14, wherein the program is selected from the group comprising: an operating system ("OS"), an enterprise management program, a financial management program, a personnel management program, a utility program, a communication program, and a database program.

18. The computer program product according to claim 14, further comprising:

computer readable program code configured to determine that a device running the program has insufficient memory to process a request; and computer readable program code configured to, in response to determining that the device running the program has insufficient memory to process the request, remove the inflection point from the program.

* * * * *